United States Patent [19]

Vietor

[11] 3,752,967
[45] Aug. 14, 1973

[54] ASCENT AND DESCENT SLOPE TRACKER SYSTEM

[76] Inventor: Carl W. Vietor, 2116 Linda Flora Dr., Los Angeles, Calif. 90024

[22] Filed: Dec. 20, 1971

[21] Appl. No.: 209,850

[52] U.S. Cl.......... 235/150.22, 244/77 A, 244/77 D
[51] Int. Cl.......................... G06g 7/78, G06f 15/50
[58] Field of Search.............. 324/108 R; 244/77 A, 244/77 D; 235/150.22

[56] References Cited
UNITED STATES PATENTS
3,665,465  5/1972  Miller ........................ 235/150.22 X Primary Examiner—Malcolm A. Morrison
Assistant Examiner—R. Stephen Dildine, Jr.
Attorney—William H. Maxwell

[57] ABSTRACT

Aircraft instrumentation that presents a readout or control by which said aircraft can be piloted along a predetermined slope or any selected slope to a waypoint, utilizing normally available area navigation inputs and characterized by its adaptability to dynamic conditions; comprised generally, of a present position and speed to a waypoint slope ratio generator means, a synthetic slope generator means and/or a slope initiator and memory means, a comparator means balancing the outputs of the first mentioned generator means and either the synthetic slope generator means or the slope initiator and memory means and powering a readout or equivalent aircraft control; and to the end that readily available navigational inputs are advantageously employed in the determination of and adherence to selected ascent and/or descent slopes to a waypoint.

40 Claims, 5 Drawing Figures

ASCENT AND DESCENT SLOPE TRACKER SYSTEM

Reference is made to Disclosure Document No. 005,100 filed May 3, 1971, which describes, fundamentally, the concept herein disclosed.

BACKGROUND

Basically, there are three conditions of flight to be considered by an aircraft pilot; namely ascent, level flight and descent, and it is the ascent and descent phases with which the present invention is primarily concerned. Fundamentally therefore, the system herein disclosed is concerned with the factors of space management, energy management and time management, and all of which is correlated to produce path or route determinations.

The state of the art provides for the accuracy of three-dimensional flight only in the area of instrument approaches to a runway, and when outside this area during ascent and descent the pilot has no way of knowing exactly where he will reach his altitude, and for example he merely keeps climbing or descending until he reaches the required altitude and subsequently enters the area of two-dimensional flight or level flight on the XY axes. Thus, the pilot merely chooses some rate of ascent or descent which is acceptable to enable him to reach a required altitude, and presently the Airways Traffic Control authority is not prepared to set such requirements and cannot define three-dimensional ascent and descent flight. Consequently, in order for a pilot to arrive at a waypoint at a required speed, he must ascend or descend to the altitude of the waypoint in advance of his arrival there, whereupon he accelerates or decelerates to the required speed with sufficient margin so as to avoid violation of authority rule. In other words, the pilot must circumvent the practice of accurate energy management.

It is reasonable to predict that the efficient use of air space will require three-dimensional airways from take-off to landing, and this will include the ascent and descent phases, in place of the air space blocks presently utilized. It is contemplated, therefore, that aircraft space and time separation management will be preempted by the authority rule of Airways Traffic Control while space and energy management will remain in the domain of aircraft control. To these ends in-flight data, as follows must be taken fully into consideration; namely, the aerodynamics of the aircraft, the effect of gravity, the effect of wind, Airways Traffic Control requirements, and cabin pressurization limitations. As to the aerodynamics of the aircraft, all present day jet transport aircraft have approximately the same lift-drag ratio and consequently a single airways descent and similar climb slopes will be substantially efficient for all jet transport aircraft.

In order to arrive at a waypoint or fix at a predetermined speed it is necessary to account for the acceleration and/or deceleration capabilities of the aircraft. Acceleration during climb is determined for the most part by the thrust-weight ratio thereof, and the aircraft thrust capability is usually in excess of requirements during the ascent phase of flight. However, there are several ways to decelerate an air-craft, requiring the following management considerations: The Airways Traffic Controller requires time flexibility in order to program the aircraft to a given fix in sequence with both space and time separation, while the pilot requires space flexibility in order to maneuver his aircraft as required. For time flexibility the adjustment should be accomplished in a minimum of time, and for space flexibility a speed adjustment should be accomplished in a minimum of distance. These two self-evident criteria indicate that a level flight idle thrust slow down from cruise to the predetermined speed is a most logical solution. And, in order to standardize the other variables, slow down will occur in theory at maximum landing weight under standard atmospheric conditions leaving only the airplane characteristics, the altitude at which the aircraft is decelerated and the effect of the wind as the remaining variables. Since it has been determined that all the present day jet transport aircraft have similar deceleration characteristics under these described conditions, any small differences can be tolerated within the Airways Traffic Control needs for accurate time spacing and distance spacing. A deceleration device following these principles can be programmed in response to altitude and ground speed sensed as in-flight data of the aircraft being processed.

The ascent and descent slope tracker system of the present invention integrates the navigational requirements of modern day transport jet aircraft so as to be effectively operational under Airways Traffic Control conditions; and the following terms and formulas are those which are ascribed to this useful purpose:

S = Slope factor, the number of miles forward progress of the aircraft per thousand feet of ascent or descent.
A = The altitude of the aircraft.
Aw = The altitude of the waypoint.
DME = The distance measured from the aircraft to a waypoint.
K = The conversion factor.
GS = The ground speed in knots.
Fs = The predetermined minimum calibrated air speed converted to ground speed.

The formula $K(GS - Fs)_{Lim = 0}$ expresses the deceleration distance requirement to the predetermined minimum speed as a function of in-flight conditions.

The formula $Pc = S[(Aw - A)/1000]$ expresses predicted distance to a waypoint on a sloped climb profile.

The formula $Pd = S[(A - Aw)/1000]$ expresses the predicted distance to a waypoint on a descent profile.

The two foregoing formulas define the locus points along predetermined minimum speed paths and do not include the deceleration requirements. Therefore, the aircraft must be offset from this path in order to account for any required deceleration, this condition for descent being represented by the formula, as follows:

$$Pw = S[(A - Aw)/1000] + K(GS - Fs)_{Lim = 0}$$

In order that the aircraft be in a correct position relative to the waypoint for its in-flight condition involving altitude distance and speed, the predicted distance to the waypoint must be equal the actual distance to the waypoint. Therefore, Pw must equal DME and DME can therefore be substituted in the formula for Pw, as follows:

$$DME = S[(A - Aw)/1000] + K(GS - Fs)_{Lim = 0}$$

The method of navigating the aircraft during ascent and descent is correlated to the last mentioned formula in order to satisfy the affects thereof, and this is accomplished by the comparison of predicted and actual slope factors; or comparison of predicted to actual DME data; and/or comparison of predicted to actual altitude data. The described system compares predicted to actual slope factors, however any one of the inputs can be used for comparison.

To develop the formula to a useful form, for the purposes herein disclosed, the deceleration component is subtracted from both sides of the equation, as follows:

$$DME - K\,(GS - Fs)_{Lim\,=\,0} = S\,[(A - Aw)/1000]$$

and from this formula any one of the four basic factors can be extracted:

1. Slope Factor,
2. DME Factor,
3. Altitude of the aircraft factor,
4. and Altitude Differential between aircraft and waypoint factor. The example shown above shows derivations of slope factor by putting the formula in the form of a fraction, shown as follows:

$$S = \frac{DME - K(GS - Fs)\,Lim}{\frac{(A - Aw)}{1000}} = 0$$

FIELD OF INVENTION

The in-flight data hereinabove referred to is processed by the tracker system to move an indicator or alternatively to operate a pilot means, the primary object of this invention being to determine the optimum and/or selected ascent and/or descent slope for an aircraft regardless of its feasible distance from a waypoint to be reached under predetermined speed conditions. For example, STOL craft have a wide slope range capability and the pilot has a correspondingly wide choice of slopes for ascent and descent; but the pilot needs an instrument to determine said slope from whatever position and speed the aircraft is relative to said waypoint, and to indicate whether or not the craft is on or near the slope and/or its magnitude of displacement therefrom. The same problems prevail with fixed wing aircraft which operate at higher speeds and at lesser angles of ascent and descent.

It is an object of this invention to establish a slope in the form of an ascent or descent track along which an aircraft is controllably navigated to arrive at a waypoint under predetermined conditions. With the tracker system of the present invention the pilot can bring his aircraft through a precise waypoint at exacting speeds, while utilizing the aircraft energy to utmost efficiency.

It is also an object of this invention to provide for the efficient management of time, space and energy in the navigation of aircraft through both ascent and descent phases of flight. In any case, maximum use of both potential and kinetic energy is employed which is also conducive to the most efficient use of time.

Another object of this invention is to provide a flight system and aircraft instrumentation which most efficiently manages the space, time, and energy considerations of the aircraft relative to waypoints. By this method a most efficient end result is obtained with the least expenditure of power exercised within minimum lengths of time.

SUMMARY OF INVENTION

The ascent and descent slope tracker system of the present invention comprises, generally, a slope ratio generator A, a slope comparator B, a slope generator C, a slope initiator and memory means D, a deceleration factor means E, a readout means F, and a resolution means R. The means A through R are incorporated in the in-flight equipment and they are operable when associated with the inputs hereinabove set forth. The slope ratio generator A takes the above mentioned factors and relates them according to the formula shown in the drawings in order to produce the existing slope factor of the in-flight aircraft relative to the waypoint. This involves prevailing position and speed of the aircraft. The slope comparator B is a ratio responsive device, for example a bridge circuit which produces a signal proportionate to any imbalance between the outputs of the slope ratio generator A and either the slope generator C or the slope initiator and memory means D. The slope generator C is a device for producing a predetermined slope factor, for example a factor best suited to the aircraft related to traffic control needs. Further, a series of programmed slopes can be generated thereby for climb corridor requirements. The slope initiator and memory means D is a means that is momentarily responsive to the closure of a switch (as shown) to retain the prevailing slope factor, to be applied through to the waypoint. The deceleration factor means E is essentially a corrector means that is programmed to determine the signal of this tracker system as it is related to the speed change capability of the particular aircraft involved, and all of which is determined by the present ground speed and the predetermined minimum calibrated airspeed converted to groundspeed. The readout means F can vary in form and is primarily a displacement indicator, such as the presently used glide slope indicator, or the presently used horizon director indicator, or the like.

DRAWINGS

The various objects and features of this invention will be fully understood from the following detailed description of the typical preferred form and application thereof, throughout which description reference is made to the accompanying drawings, in which.

PREFERRED EMBODIMENT

This ascent and descent slope tracker system is useful in the execution of inflight navigation for aircraft of all types by determining optimum slopes with respect to waypoints to be reached, and all of which is operational through the coordinated use of basic navigational factors including altitude and distance values available as in-flight information in the aircraft. It is preferred that this system process said in-flight data and present a readout for the pilot by which the aircraft can be piloted to a waypoint from whatever position and speed the aircraft may be relative to said waypoint, and to indicate whether or not the aircraft is on a flight path compatible with an arrival at said waypoint at a predetermined minimum speed. To these ends the last mentioned formula or equivalents thereof are employed and which involves navigational input factors as follows:

1. Present altitude of the aircraft.
2. Altitude of the waypoint.
3. Ground speed of the aircraft.
4. Distance to waypoint from present position of the aircraft.

With the aforementioned in-flight data and area navigational information, the system is operable to direct the pilot to a selected three-dimensional waypoint. And in the block diagram of FIG. 1 it will be observed that said navigational inputs are received by the slope ratio generator A as electrical potentials, there being a line 10 supplying the present altitude potential of the aircraft, a line 11 supplying the altitude of the waypoint potential as selected by the pilot, a line 12 supplying the ground speed potential of the aircraft, and a line 13 supplying the DME to waypoint potential. The probe sources, transducers, Distance Measurement Equipment, and the like, normally part of the aircraft are indicated generally. It is to be understood that these several inputs are available in an operational aircraft having Area Nav or Inertial Navigational equipment or the like.

Figures 1, 2:
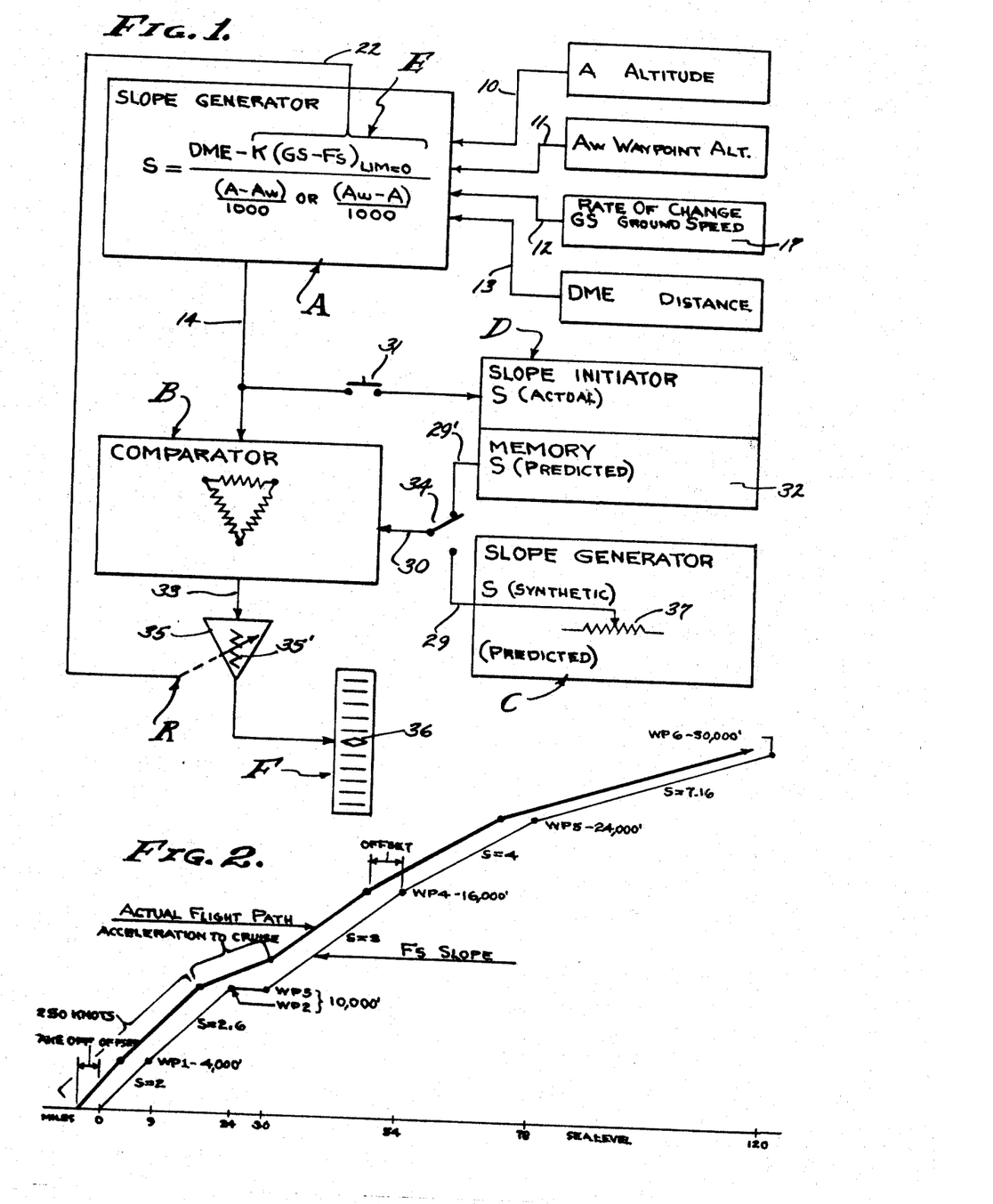
FIG. 1 is an electrical block diagram showing a typical embodiment of the present ascent and descent slope tracker system and a characteristic readout therefor.
FIG. 2 is a diagrammatic view of a typical ascent profile through a 30,000 foot waypoint.
Figure 3:
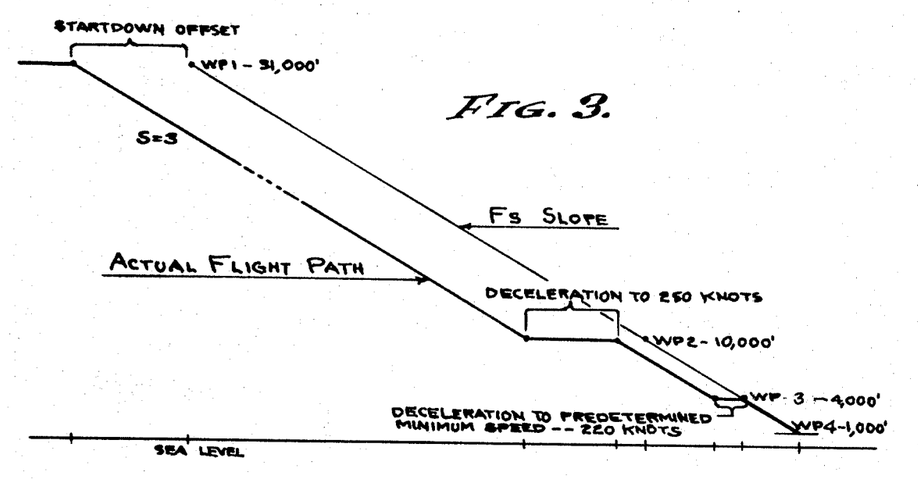
FIG. 3 is a diagrammatic of a typical descent profile from a cruise altitude to a touchdown waypoint.

The slope ratio generator A takes the above mentioned factors through lines 10–13 and relates them according to the formula shown in the drawings in order to produce the present existing slope factor of the inflight aircraft. Those factors which are not supplied as navigational factor inputs are programmed into the slope ratio generator A in order to satisfy the speed change formula $K(GS - Fs)_{Lim = 0}$ and the predicted distance to waypoint formula $S[(A - Aw)/1000]$ or $S[(Aw - A)/1000]$.

The output of generator A is $S$ which is the slope factor defined as the number of miles forward per thousand feet of ascent or descent, and which eminates through line 14. The conversion factor $K$ represents the conversion of ground speed differential between $GS$ and $Fs$ into an electrical signal that adjusts the result of $S(A - Aw/1000)$, the reference path upon which the waypoint is located, so as to offset the aircraft sufficiently to allow for deceleration to predetermined minimum speed when reaching the reference path. These factors are established by means in each instance generating electrical potentials in relation to each other and to set in-flight navigational factors according to the formula described and shown.

Figure 4:
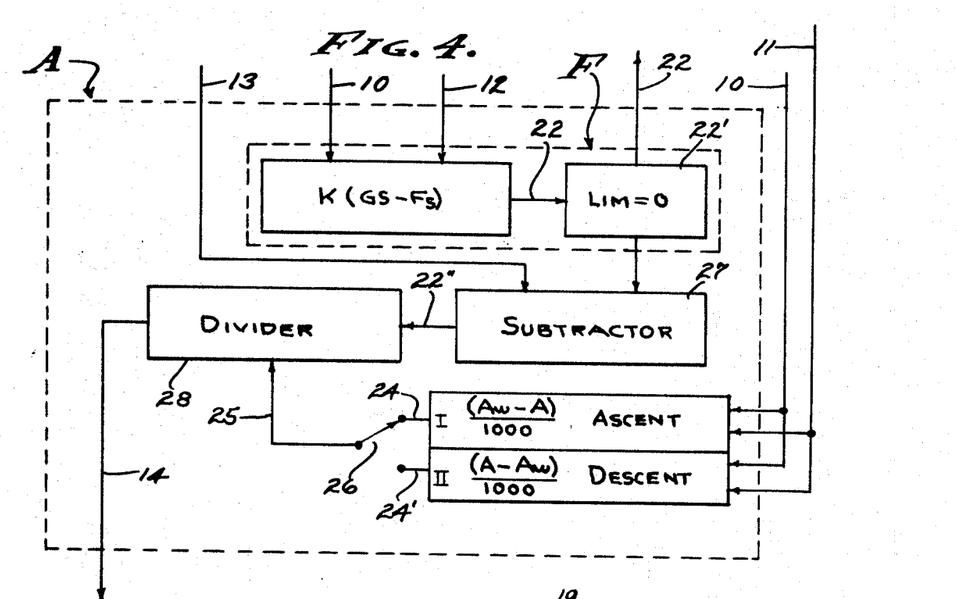
FIG. 4 is a detailed electrical block diagram of a portion of the schematic of FIG. 1.
Figure 5:
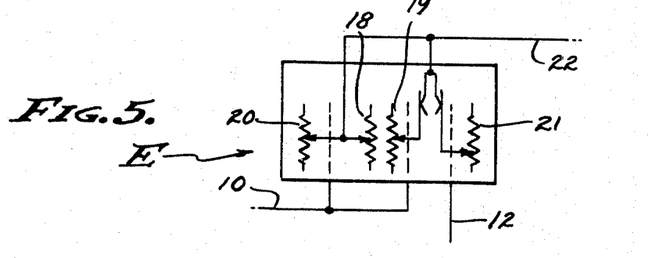
FIG. 5 is an enlarged detailed electrical schematic of a portion of the diagram shown in FIG. 4.

Referring now to the deceleration factor generator means E, the $K(GS - Fs)_{Lim = 0}$ portion of the formula is involved and which is diagrammatically detailed as means in FIGS. 4 and 5 of the drawings. Means within the generating means E produce the electrical potentials of values $K$, $FS$ and the controlling Zero Limit, while the ground speed factor $GS$ is supplied exclusively thereto through line 12. The means E is essentially a signal output means, the output being a function of the speed change or slow down factor, the signal being small when the value of $GS$ equals $Fs$, and being large when the value of $GS$ exceeds $Fs$ in proportion to the difference between $GS$ and $Fs$. A specific embodiment of the generator means $E$ is shown in FIG. 5 wherein a speed change comparator circuit is used which recognizes the speed change characteristic of aircraft in the family thereof under consideration. For example, typical present day jet aircraft decelerate from cruise speed to flap speed in level flight, at maximum landing weight and still air at 10,000 feet altitude, in a distance of 10 miles when at idle thrust. As shown, the comparator circuit of means E has an output line 22 that has a negative voltage affect so as to offset the slope path a distance equivalent to that which is required for a calculated speed change. In order to formulate the output through line 22, a basic altitude factor signal is channeled to the comparator through line 10 and a corrective signal is channeled thereto through a line 12 from the DME rate of change means 17, and all of which is processed for the establishment of a distance offset or speed-change factor signal through line 22. The altitude information through line 10 provides the controlling basis for establishing a deceleration factor from cruise speed to pre-determined minimum speed and which varies as a function of altitude. In this respect, graphic curves are developed and established for each particular aircraft type, and namely one for a cruise speed curve that gives the true airspeed for a given altitude, and namely another that gives the true airspeed for a given altitude at a predetermined minimum speed (usually in calibrated airspeed). These two curves are related and the functional difference between the two is proportionate to distances at operational altitudes to show the distance factor necessary for slow-down of the particular aircraft involved, and to this end a speed change factor is established (for the particular aircraft involved) and which varies with altitude and which is correct for still air corrected to actual conditions by the addition or subtraction of a signal for the difference between still air ground speed and actual ground speed.

A typical circuit for establishing this calculated speed change factor is illustrated in the comparator circuit of FIG. 5 wherein there are three variable voltage means, one a pair of variable resistances 18 and 19 each having the characteristics of the cruise speed curve for example a Mach .85 curve for all altitudes, a second variable resistance 20 having the characteristics of the maximum flap speed curve for example a 220 calibrated airspeed curve for all altitudes, and a third variable resistance 21 having the characteristics of known ground speed. The resistances 18, 19, 20 and 21 are powered or biased by suitable power supplied (not shown) and in each instance to establish the high, low and variable signals therebetween. The cruise speed (19) Mach .85 curve is in practice a straight line function, and although the predetermined minimum speed (20) is a true curve it is for all practical purposes a straight line function and is treated as such. In accordance with the invention, the basic altitude function is to affect the variable output of resistances 18, 19 and 20, and to this end the altitude information through line 10 simultaneously and correspondingly shifts the output of the resistances 18 and 20 and collects them to be fed through line 22. The resistance 19 is affected simultaneously by the altitude information, as shown. As hereinabove stated, the cruise speed in Mach .85 (or other Mach value) represents true airspeed and for all practical purposes for all altitudes, and therefore the above described affect of the altitude information through line 10 correspondingly affects the variable resistance 20 representing the function of a calibrated airspeed (and close approximation thereof even at low altitudes) to which known ground speed can be related so as to establish any differential or offset which may exist. In this latter respect therefore, the rate of change information of the rate indicator 17 through line 12 shifts the output of the resistance 21 and collects it and the separately affected output resistance 19, for comparison, and feeds the resultant through line 22 for correction of the still air signal derived from the balance between resistances 18 and 20. Thus, the speed change and the winds which invariably offset the aircraft speed are automatically compensated for.

Referring now to the summation involved in the numerator portion of the formula, the output through line 22 is limited to Zero by control means 22' provided therefore as shown, and the result is subtracted by subtractor means 27 from the DME input 13 of the distance measured from the aircraft to a waypoint. The said subtraction or summation is the numerator of the formula in the output potential in line 22" which is then to be divided as next described.

Referring now to the denominator portion which is determined by the descent or ascent operation of the aircraft, an electrical potential is produced in line 25 by which the numerator of the formula in line 22" is divided. This portion of the slope generator A is a dual channel predictor means which itself involves numerator and denominator means producing ascent and/or descent displacement signal potentials in lines 24 and 24' for selectively dividing the numerator of the formula. As shown, the comparator numerator of channel I involves means subtracting the electrical potential of the waypoint altitude (line 11) from the electrical potential of the present aircraft altitude (line 10), while the comparated numerator of channel II involves means subtracting the electrical potential of the present aircraft altitude (line 10) from the waypoint altitude potential (line 11). The output of one of these channels is selected by means of a switch 26 and in each case divided by an electrical output of means generating a potential having the value of 1000 as related to that number of altitude feet. As shown in FIG. 4, the selected output in line 25 is the denominator received by a divider means 28 thereby to affect the numerator output in line 22" to produce a quotient output in line 14. As a result, a slope factor is produced in line 14, for either ascent or descent representing the number of miles forward progress of the aircraft per thousand feet of ascent or descent which ever the case may be. Other measuring scales can of course be used for altitude and distance etc., such as metric scales.

In accordance with this invention, means C is provided to generate synthetic slope values and means D is provided to generate prevailing (instantaneously selective) slope values, and either of which is to be compared by means B with the slope factor value in output line 14 above described. A selector switch 34 determines the use of either means C or D, directing the outputs thereof to the comparator means B.

Referring now to the slope generator C, a slope factor potential is produced thereby, a synthetic factor produced according to predetermined altitude of and distance to the selected waypoint. In practice, the generator C is programmed for ascent or descent and adjusted by a tape or the like, manually or by the pilot, as by adjusting a variable resistance 37 that produces a voltage potential representing the slope factor to be complied with. The synthetic output potential of generator C is similar to the slope factor signal S of means A and eminates through output line 29 to be selectively used in the slope comparator means B.

Referring now to the slope initiator and memory means D, an instantanously existing (actual) slope factor is received thereby from means A, slope factor S calculated by the aforementioned formula $$S = \frac{DME - K(GS - Fs)Lim}{\frac{(A - Aw)}{1000}} = 0$$

or the equivalent ascent formula. In practice, a sampling switch 31 is momentarily closed to output line 14 and places the existing slope value S for ascent or descent in memory 32. The selected value of generator D eminates through output line 29' to be selectively used in slope comparator B, the output of either line 29 or 29' being selected by means of a selector switch 34 and fed to a line 30.

From the forgoing it will be apparent that I have provided either a synthetic or an instantaneously selected slope value to be compared with an actual dynamically updated value which represents the actual slope of the aircraft. It is the latter and actual slope value representation which is produced by the means herein disclosed and which is then compared with either of the two former slope values in the slope comparator B which is a ratio responsive means, for example a bridge circuit which produces a signal proportionate to any imbalance between the output of lines 14 and 30. To these ends therefore, the comparator B has an output line 33 that powers the readout means F, for example through an amplifier 35, thereby moving an indicator or pointer 36 or the like relative to a reference point by which the pilot (manual or automated) can discriminately determine displacement of the aircraft from the instantaneous or pre-selected slope.

The time interval required for pilot response and inertia at high speed are factors to be considered, and in accordance with this invention I provide the resolution means R which adjusts the readout means F so as to compensate for increased speed of the aircraft at higher altitudes, and inversely to compensate for a decrease at lower altitudes. As shown, the output of the deceleration factor generator means E is employed to govern the resolution means R, the output through line 22 as limited to Zero by control means 22' being used to adjust the output of amplifier 35. In practice, the deceleration factor output of line 22 operates by means of its potential to alter a variable resistance 35' controlling the output of amplifier 35 so as to provide the readout means F with lesser resolution at higher speeds and altitude and inversely with greater resolution at lower speeds and altitude, and all of which provides the pilot with less sensitive instrumentation at higher speeds and inversely with greater sensitivity at lower speeds.

Having described only a typical preferred form and application of my invention, I do not wish to be limited or restricted to the specific details herein set forth, but wish to reserve to myself any modifications or variations that may appear to those skilled in the art.

I claim:

1. The method of navigating an aircraft to a waypoint relative to a theoretical slope and subjected to a remaining distance to waypoint factor, an aircraft altitude factor and an altitude of the waypoint factor, and including the steps of; producing an altitude displacement factor by subtracting the altitude factor and altitude of the waypoint factor one from the other, relating the said remaining distance to waypoint factor and the altitude displacement factor and producing therefrom an actual slope factor, independently producing a predicted slope factor, and comparing the actual slope factor and the predicted slope factor producing a ratio therebetween indicating position of the aircraft relative to said theoretical slope.

2. The method of navigating an aircraft as set forth in claim 1 wherein the altitude of waypoint factor is subtracted from the aircraft altitude factor thereby relating the aircraft to a theoretical descent slope.

3. The method of navigating an aircraft as set forth in claim 1 wherein the altitude of the aircraft factor is subtracted from the altitude of waypoint factor thereby relating the aircraft to a theoretical ascent slope.

4. The method of navigating an aircraft as set forth in claim 1 wherein the aircraft is also subjected to a rate of change of distance factor by producing a distance offset factor therefrom and reducing the distance to waypoint factor thereby.

5. The method of navigating an aircraft as set forth in claim 1 wherein the aircraft is also subjected to a rate of change of distance factor, by producing a distance offset factor therefrom and reducing the distance to waypoint factor thereby, and by resolving intensity of the ratio between the actual and predicted slope factors with the magnitude thereof.

6. The method of navigating an aircraft as set forth in claim 1 wherein the independently produced predicted slope factor is a synthetic value.

7. The method of navigating an aircraft as set forth in claim 1 wherein the independently produced predicted slope factor is acquired as an instantaneous sample of said actual slope factor.

8. The method of navigating an aircraft as set forth in claim 1 wherein the aircraft is also subjected to a rate of change of distance factor, by producing a distance offset factor therefrom and reducing the distance to waypoint factor thereby, and by resolving intensity of the ratio between the actual and predicted slope factors with the magnitude thereof, and wherein the independently produced predicted slope factor is synthetic value.

9. The method of navigating an aircraft as set forth in claim 1 wherein the aircraft is also subjected to a rate of change of distance factor, by producing a distance offset factor therefrom and reducing the distance to waypoint factor thereby, and resolving intensity of the ratio between the actual and predicted slope factors with the magnitude thereof, and wherein the independently produced predicted slope factor is acquired as an instantaneous sample of the said actual slope factor.

10. An airborne slope tracker system for the navigation of aircraft along a slope to a predetermined waypoint, and including; an altitude displacement means producing an altitude factor signal, a distance displacement means producing a remaining distance factor signal, means relating the altitude factor signal and the distance factor signal and producing therefrom an actual slope factor signal, a slope determining generator means producing a predicted slope signal, and a comparator means responsive to the ratio between the said actual slope factor signal and the said predicted slope signal and producing therefrom a navigation signal.

11. The slope tracker system for navigating aircraft as set forth in claim 10, wherein the said remaining distance factor signal is modified by a deceleration factor generating means producing a distance offset signal, there being means subtracting the said distance offset signal from the remaining distance factor signal and producing a modified remaining distance factor signal.

12. The slope tracker system for navigating aircraft as set forth in claim 10, wherein the said remaining distance factor signal is modified by a deceleration factor generating means producing a distance offset signal with means limiting the same to Zero, there being means subtracting the said distance offset signal from the remaining distance factor signal and producing a modified remaining distance factor signal.

13. The slope tracker system for navigating aircraft as set forth in claim 10, wherein the altitude displacement means includes means subtracting altitude of the waypoint from altitude of the aircraft to produce an altitude factor descent signal.

14. The slope tracker system for navigating aircraft as set forth in claim 10, wherein the altitude displacement means includes means subtracting altitude of the aircraft from altitude of the waypoint to produce an altitude factor ascent signal.

15. The slope tracker system for navigating aircraft as set forth in claim 10, wherein the altitude displacement means is a dual channel means with one channel that subtracts altitude of the waypoint from altitude of the aircraft to produce an altitude factor descent signal, and a second channel that subtracts altitude of the aircraft from altitude of the waypoint to produce an altitude factor ascent signal, there being selector means directing the output signal of one of said channels to said means relating the altitude factor signal and the distance factor signal.

16. The slope tracker system for navigating aircraft as set forth in claim 10, wherein the altitude displacement means includes means subtracting altitude of waypoint from altitude of the aircraft to produce an altitude factor descent signal, there being means dividing the altitude factor descent signal by an increment factor signal related to altitude of the aircraft.

17. The slope tracker system for navigating aircraft as set forth in claim 10, wherein the altitude displacement means includes means subtracting altitude of the aircraft from altitude of the waypoint to produce an altitude factor ascent signal, there being means dividing the altitude factor ascent signal by an increment factor signal related to altitude of the aircraft.

18. The slope tracker system for navigating aircraft as set forth in claim 10, wherein the altitude displacement means is a dual channel means with one channel that subtracts altitude of the waypoint from altitude of the aircraft to produce an altitude factor descent signal, and a second channel that subtracts altitude of the aircraft from altitude of the waypoint to produce an altitude factor ascent signal, there being means associated with each of said channels dividing the altitude factor signal thereof by an increment factor signal related to altitude of the aircraft, there being selector means directing the output signal of one of said channels to said means relating the said altitude factor signal and the distance factor signal.

19. The slope tracker system for navigating aircraft as set forth in claim 10, wherein the said remaining distance factor signal is modified by a deceleration factor generating means producing a modified distance offset signal varied by means responsive to aircraft altitude and speed, and wherein resolution means responsive to said modified distance offset signal adjusts the magnitude of the navitation signal inversely in proportion to the magnitude of said distance offset signal.

20. An airborne slope tracker system for the navigation of aircraft along a slope to a predetermined waypoint, and including; an altitude displacement means producing an altitude offset signal, a Distance Measurement Equipment means producing a remaining distance to waypoint output signal, a deceleration factor generator means producing a distance offset signal, a subtractor means to calculate the difference between the Distance Measurement Equipment means output signal and said distance offset signal and producing a signal, a divider means utilizing the subtractor means output signal as a numerator and utilizing the altitude displacement means output signal as a denominator and producing an actual slope signal, a slope determining generator means producing a predicted slope signal, and comparator means responsive to the ratio between the said actual slope signal and the said predicted slope signal and producing therefrom a navigation signal.

21. The slope tracker system for navigating aircraft as set forth in claim 20 and wherein limit means restricts the deceleration factor means output signal to Zero.

22. The slope tracker system for navigating aircraft as set forth in claim 20, wherein a rate of change means produces a ground speed output signal GS, means producing a predetermined minimum speed signal Fs, and operating means relating the Fs signal from the GS signal each according to its effect and producing said distance offset signal.

23. The slope tracker system for navigating aircraft as set forth in claim 20, wherein a rate of change means produces a ground speed output signal GS, mean producing a predetermined minimum speed signal Fs, and operating means relating the Fs signal from the GS signal each according to its effect and producing said distance offset signal, there being means restricting the said distance offset signal to Zero.

24. The slope tracker system for navigating aircraft as set forth in claim 20, wherein an altitude detecting means produces an altitude output signal A, and wherein the deceleration factor generator means includes a variable resistance having the speed change characteristics of the aircraft related to altitude, said variable resistance being varied in response to the said altitude output signal A.

25. The slope tracker system for navigating aircraft as set forth in claim 20, wherein an altitude detecting means produces an altitude output signal A, and wherein the deceleration factor generator means includes a variable resistance having the predetermined minimum speed characteristics of the aircraft related to altitude, said variable resistance being varied in response to said altitude output signal A.

26. The slope tracker system for navigating aircraft as set forth in claim 20, wherein a rate of change means produces a ground speed output signal Gs, and wherein the deceleration factor generator means includes a variable resistance having the deceleration characteristics of the aircraft related to ground speed, said variable resistance being varied in response to said ground speed output signal GS.

27. The slope tracker system for navigating aircraft as set forth in claim 20, wherein an altitude detecting means produces an altitude output signal A, and wherein the deceleration factor generator means includes a variable resistance having the cruise speed characteristics of the aircraft related to altitude, said variable resistance being varied in response to the said altitude output signal A.

28. The slope tracker system for navigating aircraft as set forth in claim 20, wherein an altitude detecting means produces an altitude output signal A, and wherein the deceleration factor generator means includes a variable resistance having the cruise speed characteristics of the aircraft related to altitude and a variable resistance having the predetermined minimum speed characteristics of the aircraft related to altitude, said variable resistance being varied in response to the said altitude output signal A.

29. The slope tracker system for navigating aircraft as set forth in claim 20, wherein an altitude detecting means produces an altitude output signal A, wherein a rate of change means produces a ground speed output signal GS, and wherein the deceleration factor generator means includes a variable resistance having the cruise speed characteristics of the aircraft related to altitude, a variable resistance having the predetermined minimum speed characteristics of aircraft related to altitude and a variable resistance having the deceleration characteristics of the aircraft related to ground speed, variable resistance related to altitude being varied in response to the said altitude output signal A and the variable resistance related to ground speed being varied in response to the said ground speed output signal GS.

30. An airborne slope tracker system for the navigation of aircraft along a slope to a predetermined waypoint, and including; an altitude detecting means producing an altitude output signal A, an altitude of the waypoint means producing a waypoint altitude output signal Aw, a Distance Measurement Equipment means producing a remaining distance to waypoint signal, a deceleration factor generator means producing a distance offset signal, a subtractor means responsive to the difference between the Distance Measurement Equipment means output signal and said distance offset signal and producing an output signal, an altitude displacement means differentiating between the altitude signal A and waypoint altitude signal Aw producing an altitude offset signal, a divider means utilizing the subtractor means output signal as a numerator and utilizing the altitude displacement means output signal as a denominator and producing an actual slope signal, a slope determining generator means producing a predicted slope signal, and comparator means responsive to the ratio between the said actual slope signal and the said predicted slope signal and producing therefrom a navigation signal.

31. The slope tracker system for navigating aircraft as set forth in claim 30, wherein the altitude displacement means subtracts the altitude of the waypoint signal Aw from the altitude signal A to produce a descent altitude offset signal.

32. The slope tracker system for navigating aircraft as set forth in claim 30, wherein the altitude displacement means subtracts the altitude signal A from the altitude of the waypoint signal Aw to produce an ascent altitude offset signal.

33. The slope tracker system for navigating aircraft as set forth in claim 30, wherein the altitude displacement means is a dual channel means with one channel that subtracts the altitude of the waypoint signal $Aw$ from the altitude signal $A$ to produce a descent altitude offset signal, and with a second channel that subtracts the altitude signal $A$ from the altitude of the waypoint signal $Aw$ to produce an ascent altitude offset signal, there being selector means directing the output signal of one of said channels to the said divider means.

34. The slope tracker system for navigating aircraft as set forth in claim 30, wherein the altitude displacement means subtracts the altitude of the waypoint signal from the altitude signal $A$ to produce a descent altitude offset signal, and wherein limit means restricts the deceleration factor means output signal to Zero.

35. The slope tracker system for navigating aircraft as set forth in claim 30, wherein the altitude displacement means subtracts the altitude signal $A$ from the altitude of the waypoint signal $Aw$ to produce an ascent altitude offset signal, and wherein limit means restricts the deceleration factor means output signal to Zero.

36. The slope tracker system for navigating aircraft as set forth in claim 30, wherein the altitude displacement means is a dual channel means with one channel that subtracts the altitude of the waypoint signal $Aw$ from the altitude signal $A$ to produce a descent altitude offset signal, and with a second channel that subtracts the altitude signal $A$ from the altitude of the waypoint signal $Aw$ to produce an ascent altitude offset signal, there being selector means directing the output signal of one of said channels to the said divider means, and wherein limit means restricts the deceleration factor means output signal to Zero.

37. The slope tracker system for navigating aircraft as set forth in claim 30, wherein the deceleration factor generator means includes a variable resistance having the speed characteristics of the aircraft related to altitude, said variable resistance being varied in response to the said altitude output signal $A$, and wherein the altitude displacement means subtracts the altitude of the waypoint signal $Aw$ from the altitude output signal $A$ to produce a descent altitude offset signal.

38. The slope tracker system for navigating aircraft as set forth in claim 30, wherein the deceleration factor generator means includes a variable resistance having the speed characteristics of the aircraft related to altitude, and wherein the altitude displacement means subtracts the altitude signal $A$ from the altitude of the waypoint signal $Aw$ to produce an ascent altitude offset signal.

39. The slope tracker system for navigating aircraft as set forth in claim 30, wherein the deceleration factor generator means includes a variable resistance having the speed characteristics of the aircraft related to altitude, and wherein the altitude displacement means is a dual channel means with one channel that subtracts the altitude of the waypoint signal $Aw$ from the altitude and with a second channel that subtracts the altitude signal $A$ from the altitude of the waypoint signal $Aw$ to produce an ascent altitude offset signal, there being selector means directing the output signal of one of said channels to the said divider means.

40. The slope tracker system for navigating aircraft as set forth in claim 30, wherein the said remaining distance factor signal is modified by a deceleration factor generating means producing a modified distance offset signal varied by means responsive to aircraft altitude and speed, and wherein resolution means responsive to said modified distance offset signal adjusts the magnitude of the navigation signal inversely in proportion to the magnitude of said distance offset signal.

* * * * *

UNITED STATES PATENT OFFICE
CERTIFICATE OF CORRECTION

Patent No. 3,752,967     Dated August 14, 1973

Inventor(s) Carl W. Vietor

It is certified that error appears in the above-identified patent and that said Letters Patent are hereby corrected as shown below:

Column 3, lines 19 to 23 and Column 8, lines 7 to 9, the formula,, each occurrence, should appear as shown below:

$$S = \frac{DMR - K(GS - Fs)}{\frac{(A - Aw)}{1000}} \quad \underline{Lim = 0}$$

Signed and sealed this 12th day of February 1974.

(SEAL)
Attest:

EDWARD M. FLETCHER, JR.
Attesting Officer

C. MARSHALL DANN
Commissioner of Patents